United States Patent [19]
Kohn

[11] 3,986,166
[45] Oct. 12, 1976

[54] ANTI-TAMPER AUTOMOBILE ALARM SYSTEM UTILIZING PLURAL REED TYPE SWITCHES

[75] Inventor: Michel André Kohn, Chennevieres, France

[73] Assignee: International Detection Protection, Paris, France

[22] Filed: Nov. 7, 1974

[21] Appl. No.: 521,852

[30] Foreign Application Priority Data
Nov. 7, 1973  France .................. 73.39569

[52] U.S. Cl. .................. 340/63; 340/253 P; 340/248 P; 307/10 AT; 180/114
[51] Int. Cl.² .................. B60R 25/10
[58] Field of Search ......... 340/63, 64, 253 P, 248 P; 200/42 R; 307/10 AT; 180/114

[56] References Cited
UNITED STATES PATENTS
3,706,966   12/1972   So et al. .................. 340/63

Primary Examiner—Alvin H. Waring
Attorney, Agent, or Firm—Young & Thompson

[57] ABSTRACT

An alarm system for automobiles, which is actuated when an unauthorized person tampers with the automobile. An inductive coupling is made with the automobile electrical system so that a variation in current flow in the system activates the alarm. An actuating switch of the reed type is made operative by the driver utilizing a magnet. A deenergizing switch, of the reed type, located remotely from the actuating switch is used to make the system inactive at the driver's option. An auxiliary reed type switch is located adjacent the deenergizing switch and activates the alarm if an unauthorized person attempts to use the deenergizing switch.

6 Claims, 3 Drawing Figures

ANTI-TAMPER AUTOMOBILE ALARM SYSTEM UTILIZING PLURAL REED TYPE SWITCHES

Alarm systems for automobiles are known which include a detector responsive to a modification in current intensity and adapted to control an alarm device together with means for rendering the system operative and inoperative, such means being of the type comprising a yielding blade or reed contact actuatable by a magnet and located in a concealed place. In the case of an automobile, the detector may be sensitive, for instance to the passage of current through the rooflight in which case the alarm is given, when the system is operative, if any unauthorized party opens one of the front doors.

In such systems, as executed hitherto, the means for rendering the system operative and inoperative are constituted by a single switch controlling a relay providing in alternation an impulse energizing the system and an impulse deenergizing same. This switch is fitted, for instance, inside a hub cap. Such prior arrangements are not wholly reliable since any one may notice the place where the driver of the automobile sets a magnet, so as to energize the system when the driver leaves the car. An unauthorized person may use a magnet in the same location to deenergize the safety circuit.

The present invention has for its object an improved alarm system similar to such prior systems, but showing however anti-tampering features.

The improved system includes an energizing switch, a deenergizing switch independent of the latter and at least one auxiliary switch of the same type as the first-mentioned switches and independent of the latter, said auxiliary switch being adapted to control the alarm device whereby the latter is actuated by modification in the intensity of the alarm-controlling current or upon operation of the auxiliary switch.

When fitting the alarm system according to the invention in position on the automobile, the energizing and deenergizing switches are positioned at two different points of the car, the auxiliary switch being positioned near the deenergizing switch. Thus, the setting of a magnet in registry with the energizing switch, when the system is already operative, is ineffective. If an unauthorized party has noticed the point at which the driver has set his magnet, when he wishes to deenergize the system so that he may enter the car without being disturbed by the alarm, and said unauthorized party attempts to set a magnet at the same point, he has little chance of avoiding energization of the nearby auxiliary switch, so that an alarm will be given. The reliability of the system is still further enhanced through the fact that several auxiliary switches are fitted near the deenergizing switch, some of then being laid in a direction orthogonal with that of the deenergizing switch. In fact, a yielding blade switch closes when a magnet is shifted over it in a direction perpendicular to the blade and remains unchanged when the magnet is shifted longitudinally of said blade. Thus, the shifting of a magnet in the immediate proximity of the deenergizing switch in a different direction from a direction extending transversely of the blade, releases the alarm in a practically certain manner.

The improved alarm system according to the invention may act as an antitheft system. It is sufficient therefor for it to include an auxiliary circuit connected in parallel with the ignition coil and passing through a switch constituted by a diode inserted in a reversed polarity relationship. The resistance comprises a resistant wire. This arrangement is such that the heat dissipated by it does not collect within a restricted area, as would occur in the case of a compact resistance, and therefore it does not raise the temperature of the system. The resistant wire acts simultaneously as a lead whereby the wiring is made simpler and there is no problem with polarity.

The detector controlling the alarm system includes a toroid fitted over a lead fed with the current variation of which forms the energizing signal, for instance one of the battery leads. In such a case the toroid is preferably connected with the circuit controlling the alarm device through a Graetz bridge. Thus the connection with the toroid may be executed without the problem of polarity. In the case of an automobile a condenser is advantageously inserted in parallel with the Graetz bridge. In fact, the watch or clock generally provided on board an automobile produces weak current pulses which may result in a release of the alarm and the presence of the condenser acts in a manner such that the variations in intensity of the current must rise above a minimum value before they release the alarm device.

There is described hereinafter, by way of example and by no means in a limited sense, a preferred embodiment of an alarm system according to the invention, reference being made to the accompanying drawings wherein.

Figure 1:
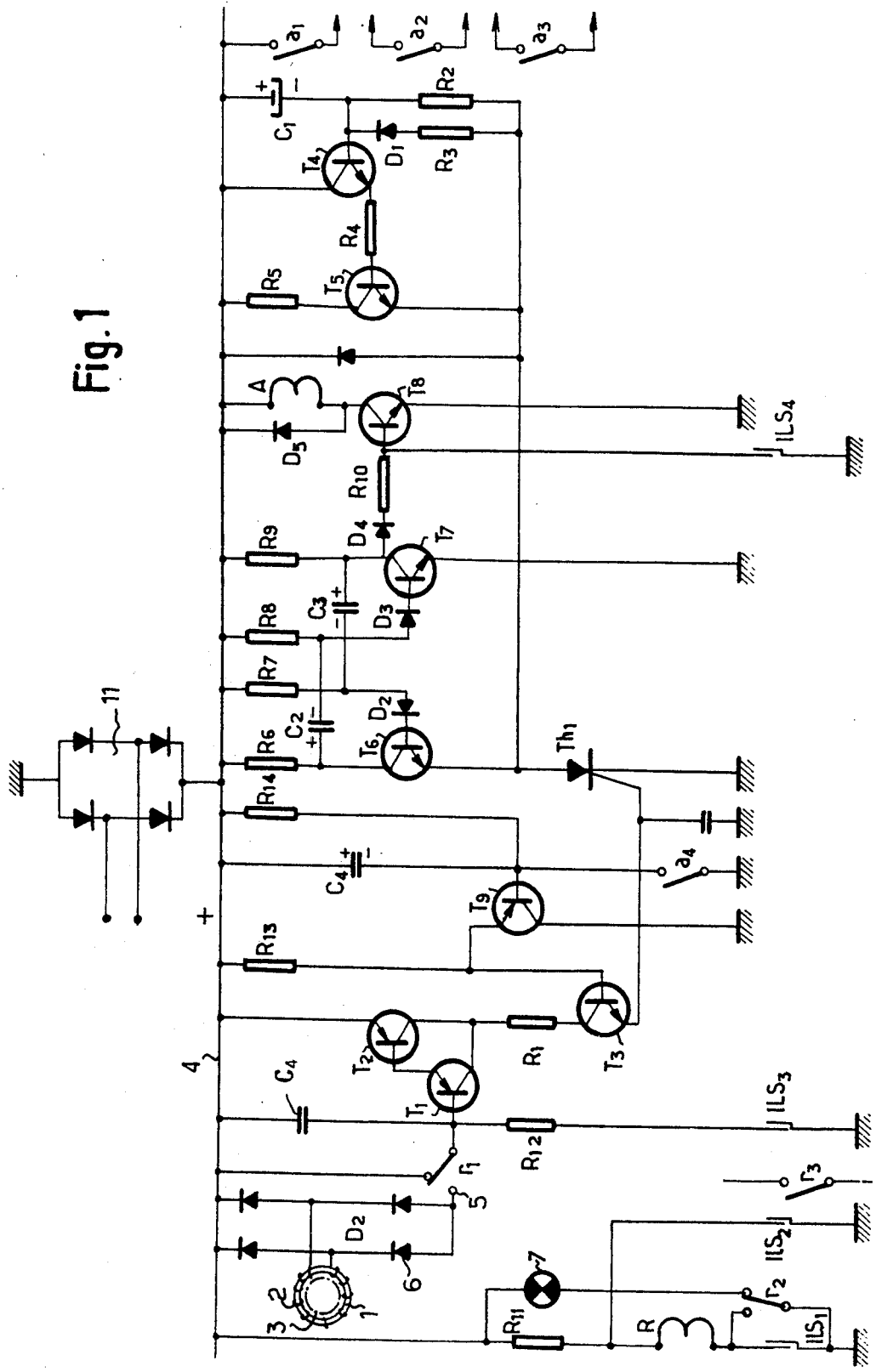
FIG. 1 is a wiring diagram of the system.

As illustrated, the alarm system includes a toroid or coil 1 around which is wound a lead 2 and which is fitted over a wire 3 leading to the battery. Said wire 3 is connected with a positive main feed wire 4 and with a terminal 5 through the agency of a Graetz bridge 6. The terminal 5 can be connected with the base of a p-n-p transistor $T_1$ forming part of a Darlington circuit $T_1-T_2$, said connection being provided by the operative contact-piece $r_1$ of a relay R controlling the operativeness and the inoperativeness of the system. When at rest, the contact-piece $r_1$ connects, as illustrated the base of the transistor $T_1$ with the wire 4.

The collectors of the transistor $T_1$ and $T_2$ are connected through a resistor $R_1$ and a transistor $T_3$ with the grid of a thyristor $Th_1$. The latter is connected with the wire 4 through a condenser $C_1$ and a resistance $R_2$, a further resistance $R_3$ and a diode $D_1$ in series therewith being connected in parallel with said resistance $R_2$. The connection between the condenser $C_1$ and the resistance $R_2$ is also connected with the base of the n-p-n transistor $T_4$ the collector of which is connected with the main wire 4 whereas its emitter is connected through the resistance $R_4$ with the base of the n-p-n transistor $T_5$. The emitter of the latter is connected with the thyristor $Th_1$ whereas its collector is connected with the main wire 4 through a resistance $R_5$.

The thyristor $Th_1$ is furthermore connected with a multi-vibrator constituted by the transistors $T_6$ and $T_7$, the resistances $R_6$, $R_7$ and $R_9$, the condensers $C_2$ and $C_3$ and the diodes $D_2$ and $D_3$, said components being selected so as to obtain a periodicity ranging between about ½ and 1 second.

The output of the multivibrator is connected with the base of an n-p-n transistor $T_8$ through a diode $D_4$ and a resistance $R_{10}$. The emitter of the transistor $T_8$ is grounded whereas its collector is connected with the main wire 4 through the winding of an alarm relay A across the terminals of which there is connected a diode $D_5$.

The relay A controls three contact-pieces $a_1$, $a_2$, $a_3$, inserted in three alarm circuits, for instance those feeding an audible alarm, the headlights and the wireless receiver respectively.

The winding of the relay R is fed by the supply of energy through a relay $R_{11}$ and a yielding blade switch $ILS_1$ inserted in parallel with the contact-piece $r_2$ of the relay R. This contact-piece $r_2$, when inoperative as shown, connects the supply of energy with a witness lamp 7. A further spring or yielding blade switch $ILS_2$ is inserted in parallel with the circuit comprising the winding section of said relay and the yielding blade switch $ILS_1$. A contact $r_3$ controlled by the controlling relay R is adapted when operative to act on the ignition coil of the automobile, so as to prevent its starting, said prevention being provided, for instance, by grounding said ignition coil or by inserting in parallel with the latter a resistance or a diode connected in opposite polarity relationship.

Furthermore, one or more auxiliary spring or yielding blade switches $ILS_3$ are connected with the base of the transistor $T_1$ through a resistance $R_{12}$. Lastly a yielding blade switch $ILS_4$ is adapted to connect the base of the transistor $T_8$ with ground and thereby to render the multivibrator ineffective and to prevent operation of the system when required.

Figure 2:
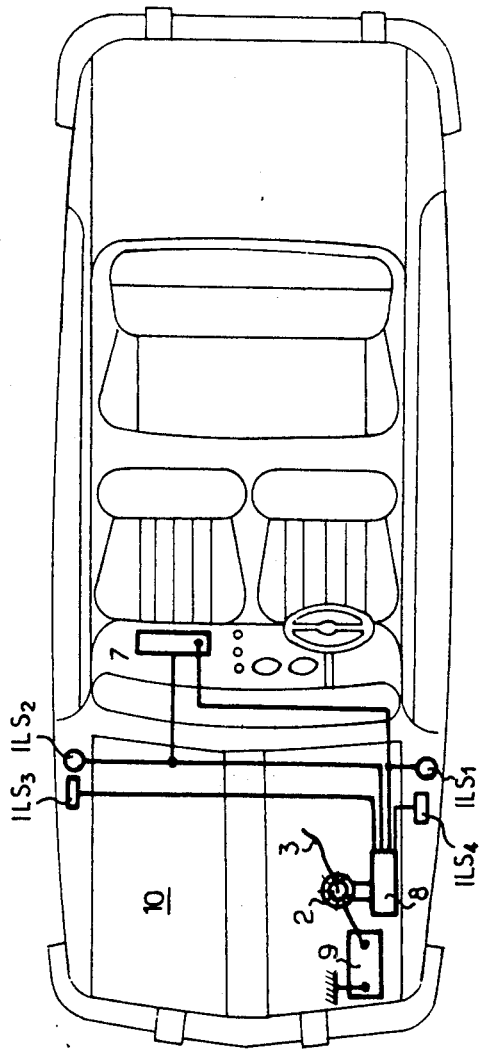
FIG. 2 shows the system as incorporated with the automobile.

FIG. 2 shows how the system is fitted on an automobile, the controlling means for said system being shown as a block 8, while the coil 1 is fitted over the lead 3 leading to the battery 9 and the switches $ILS_1$, $ILS_2$, $ILS_3$ are concealed at different well-defined points behind the bodywork 10 of the vehicle.

A magnet being brought to act upon the switch $ILS_1$, the relay R is energized and is henceforward fed through its self-energizing contact $r_2$ while the witness lamp 7 is extinguished.

In the case of a disturbance, say if anyone attempts to open the door, current begins to flow in the battery lead 3 and a pulse is sent into the base of the transistor $T_1$; said pulse is always negative whatever may be the direction of the variation in intensity in the lead 3, as provided by the presence of the Graetz bridge 6, so that the p-n-p transistor $T_1$ becomes conductive. Said pulse is thus amplified and transmitted to the thyristor $Th_1$, assuming the transistor $T_3$ is normally conductive as disclosed hereinafter.

The thyristor $Th_1$ is consequently ignited whereupon the condenser $C_1$ is loaded through the resistance $R_2$. During such a loading of the condenser $C_1$, the base of the transistor $T_4$ is positive with reference to ground, so that said transistor $T_4$ is conductive, and so is the transistor $T_5$. The thyristor $Th_1$ continues therefore to be fed through the resistance $R_5$.

During the loading of the condenser $C_1$, the multivibrator $T_6$-$T_7$ is operative, which produces on the base of the transistor $T_8$ an alternation between levels 0 and 1 whereby said transistor is alternatingly locked and operative. When the transistor $T_8$ is saturated and conductive, the relay A is energized and produces the alarm. A succession of acoustic and/or luminous signals is thus obtained and continues until the condenser $C_1$ is fully loaded. It is however possible to stop the alarm by closing the switch $ILS_4$ and holding it closed as long as the condenser $C_1$ is not completely loaded.

When the condenser $C_1$ is actually loaded, the transistors $T_4$ and $T_5$ are locked and the current holding the thyristor operative is switched off. As soon as the transistor $T_6$ of the multivibrator is in its locked condition, the thyristor $Th_1$ is switched off, and the multivibrator can no longer produce its beats, the relay A is deenergized and the alarm is no longer given.

If, on the other hand, any unauthorized person attempts to act on the relay $ILS_1$, he will of necessity act on one of the auxiliary switches $ILS_3$ whereby the base of the transistor $T_1$ is grounded through the resistance $R_{12}$ and the alarm is given.

In order to render the system inoperative, it is sufficient to act on the switch $ILS_2$ so as to deenergize the controlling relay R. The pulses generated in the toroid or coil 1 are no longer transmitted and the base of the transistor $T_1$ is no longer connected with the main wire through $r_1$, so that said transistor $T_1$ is locked.

At the end of the alarm signal, the signalling means are no longer operative, which reduces or cuts out the intensity of the current flowing through the battery lead 3. This produces in the lead 2 a current which may cause the system to resume operation.

In order to remove this drawback, the base of the transistor $T_3$ is connected with the main wire 4 through a resistance $R_{13}$ or a bias, and also with the emitter of a p-n-p transistor $T_9$ the collector of which is grounded. The base of said transistor $T_9$ is grounded through the operative contact $a_4$ of the alarm relay A and is furthermore connected with the main wire 4 through a resistance $R_{14}$ inserted in parallel with a condenser $C_4$.

When the alarm relay A is inoperative, the voltage on the base of the transistor $T_9$ is equal to that of the main wire 4, so that said transistor is locked. Therefore the base of the n-p-n transistor $T_3$ is also subjected to the same voltage and said transistor $T_3$ is conductive, as assumed hereinabove.

However, when the alarm relay A becomes operative, the base of the transistor $T_9$ is grounded and the condenser $C_4$ is loaded. The transistor $T_9$ becomes conductive whereby the base of the transistor $T_3$ is grounded and said transistor is locked.

Upon subsequent deenergization of the relay A, the contact $a_4$ reopens and the condenser $C_4$ discharges into the resistance $R_{14}$. The transistor $T_9$ remains in fact conductive during a delay period which depends on the values of the resistance and of the condenser capacity and which may be for instance of the magnitude of a few seconds. The cooperating transistor $T_3$ remains therefore locked and consequently, if a variation in intensity in the lead 3 is detected, no signal is any longer transmitted to the thyristor $Th_1$. This cuts out any automatic further operation of the system after the alarm has been given.

When the transistor $T_9$ is locked again after this delay period, it returns into a conductive condition and the system is ready to resume operation if a further disturbance arises. If it is desired to connect the system with the battery without it being necessary to take the polarity of the leads into account, it is possible to resort to rectifying means 11 inserted between the main wire 4 and ground, the connection being performed readily without any special care being required. On the other hand, the base of the transistor $T_1$ is then connected with the main wire 4 through a condenser $C_5$ so as to prevent the rectified current generated by the current pulses derived from the vehicle clock from releasing the alarm.

Figure 3:
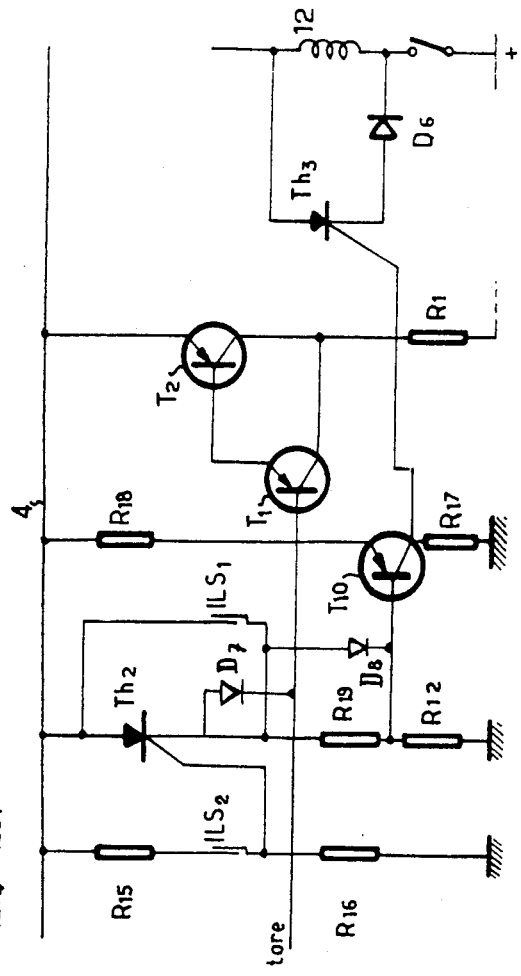
FIG. 3 is a wiring diagram of a modification.

In the modification illustrated in FIG. 3, the controlling relay R is cut out and replaced by a thyristor circuit. The base of the transistor $T_1$ to which the detecting signal is applied is here connected with the main wire 4 through a diode $D_7$ and a thyristor $Th_2$. The base of the latter is grounded through a biasing resistance $R_{12}$ and a diode $D_8$. The grid of the thyristor $Th_2$ is connected with a biasing bridge constituted by the resistances $R_{15}$–$R_{16}$ between which is inserted the switch $ILS_2$ returning the system to inoperativeness. The system energizing switch $ILS_1$ is connected in parallel with the thyristor $Th_2$. When said switch $ILS_1$ is actuated, the thyristor is short-circuited and therefore locked against operation. The detecting signal from the coil can therefore be transmitted to the transistor $T_1$. In contradistinction, when the switch $ILS_2$ is actuated, a positive pulse is applied to the grid of the thyristor $Th_2$ which becomes conductive and, consequently, the base of the transistor $T_1$ is now connected with the positive main wire 4. The transistor $T_1$ is therefore locked even when a detecting signal is transmitted.

A further thyristor $Th_3$ is adapted to prevent the automobile engine from starting while the alarm system is operative. A circuit section including said thyristor $Th_3$ and a diode $D_6$ is connected across the terminals of the ignition coil 12. The grid of the thyristor $Th_3$ is connected with the collector of a p-n-p transistor $T_{10}$, which collector is furthermore grounded through a resistance $R_{17}$. The emitter and the base of said transistor $T_{10}$ are connected respectively with the main wire 4 through a resistance $R_{18}$ and with one end of the resistance $R_{19}$, the other end of which is connected with the thyristor $Th_2$; optionally, said transistor base is grounded through $R_{12}$.

When the thyristor $Th_2$ is conductive, that is when the alarm system is inoperative, the transistor $T_{10}$ is locked, so that the grid of the thyristor $Th_3$ is grounded. The thyristor $T_3$ being no longer conductive, the ignition coil 12 can operate normally.

In contradistinction, when the alarm system is operative, the transistor $T_{10}$ is conductive and the grid of the thyristor $Th_3$ is fed by the main wire 4 through the resistance $R_{18}$; the thyristor $Th_3$ is therefore conductive and the vehicle engine cannot start.

Obviously, the present invention should not be considered as limited to the embodiments described hereinabove and illustrated in the accompanying drawings and it covers, on the contrary,, all the modifications thereof falling within the scope of the accompanying claims. In particular, the improved alarm system may be used for protecting a private dwelling or business. It would be sufficient in such a case to use as a starting point for the detecting circuit a transformer in one of the feed wires leading to the meter.

What I claim is:

1. An alarm system chiefly for use on automobile vehicles having an ignition coil and battery circuit, comprising a signal-producing detector sensitive to variation in the current intensity in the battery circuit, a controlling circuit, inductively coupled to the automobile battery circuit, adapted to actuate an alarm device upon reception of signals from the detector, a first spring blade switch in the controlling circuit adapted upon application of a magnet to energize the controlling circuit, a second concealed spring blade switch in the controlling circuit independent of the first switch and adapted upon application of a magnet to deenergize said controlling circuit, and at least one auxiliary concealed spring blade switch independent of the first and second switches but physically near the second switch and adapted upon application of a magnet to actuate said alarm device.

2. An alarm system as claimed in claim 1 adapted to prevent energization of an ignition coil on board the automobile, comprising a circuit inserted in parallel with the ignition coil and including a resistant wire and a normally open contact and means whereby the controlling circuit when energized closes said contact.

3. An alarm system as claimed in claim 1 adapted to prevent energization of an ignition coil on board the automobile, comprising a circuit inserted in parallel with the ignition coil an including a diode inserted in reversed polarity relationship and a normally open switch and means whereby the controlling circuit when energized closes said switch.

4. In an alarm system as claimed in claim 1, said detector constituted by a coil fitted around a wire for detecting modifications in current intensity in the wire, the provision of a Graetz bridge inserted between the coil and the controlling circuit.

5. In an alarm system as claimed in claim 1, said detector being constituted by a coil fitted around a wire leading to the battery of the automobile, the provision of a Graetz bridge inserted between the coil and the controlling circuit and a condenser inserted in parallel with the Graetz bridge.

6. An alarm system as claimed in claim 1 wherein the controlling circuit includes delaying means controlled by the detector signals, and modulating means fed by the delaying means and controlling the alarm device, the alarm system comprising furthermore delayed switching means controlled by the modulating means and inserted between the detector and the delaying means and adapted to deenergize the controlling circuit at the end of the alarm period defined by the delaying means.

* * * * *